March 15, 1960 — A. T. FASSERO ET AL — 2,928,119
TIRE HANDLING APPARATUS FOR RETREADING MOLDS
Filed Dec. 10, 1956 — 3 Sheets-Sheet 1

INVENTORS
ANTHONY T. FASSERO
JAMES R. MADDOX
BY George B. White
ATTORNEY

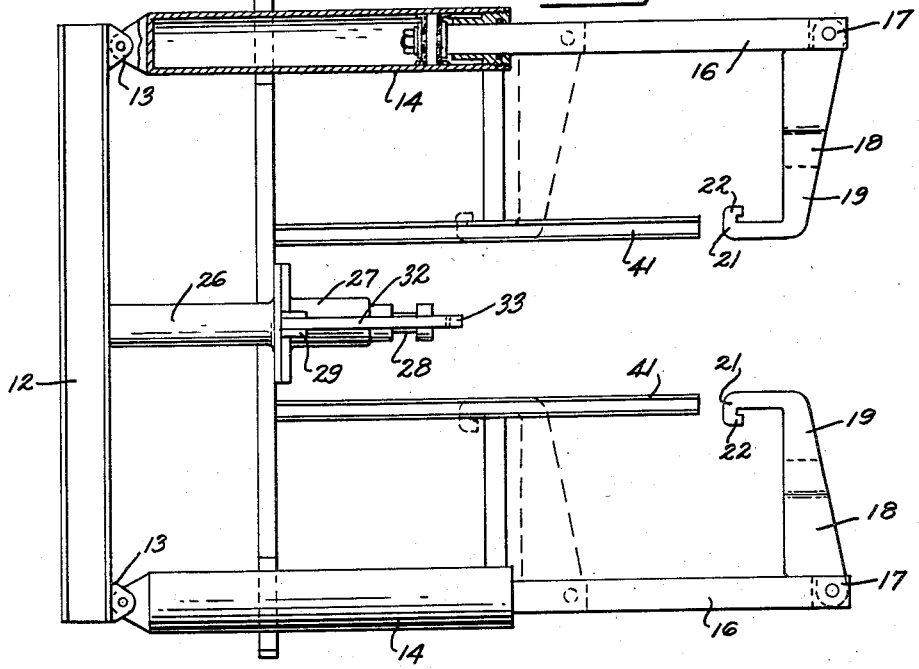
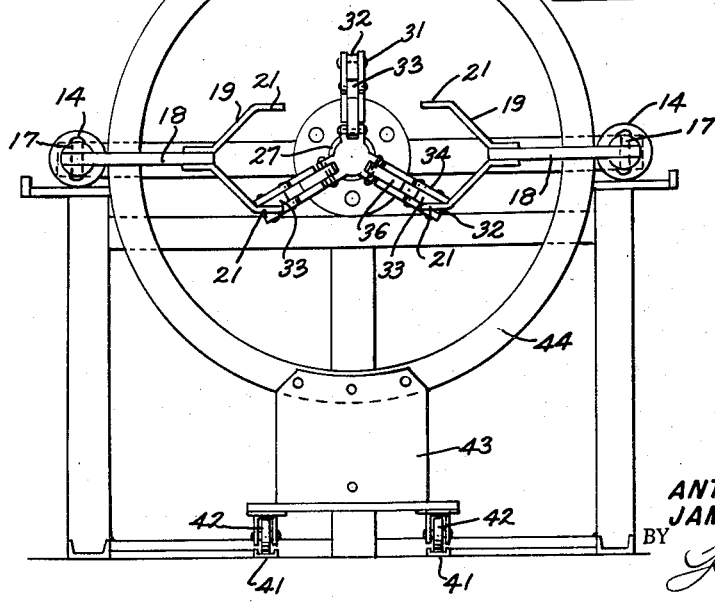

March 15, 1960 A. T. FASSERO ET AL 2,928,119
TIRE HANDLING APPARATUS FOR RETREADING MOLDS
Filed Dec. 10, 1956 3 Sheets-Sheet 3
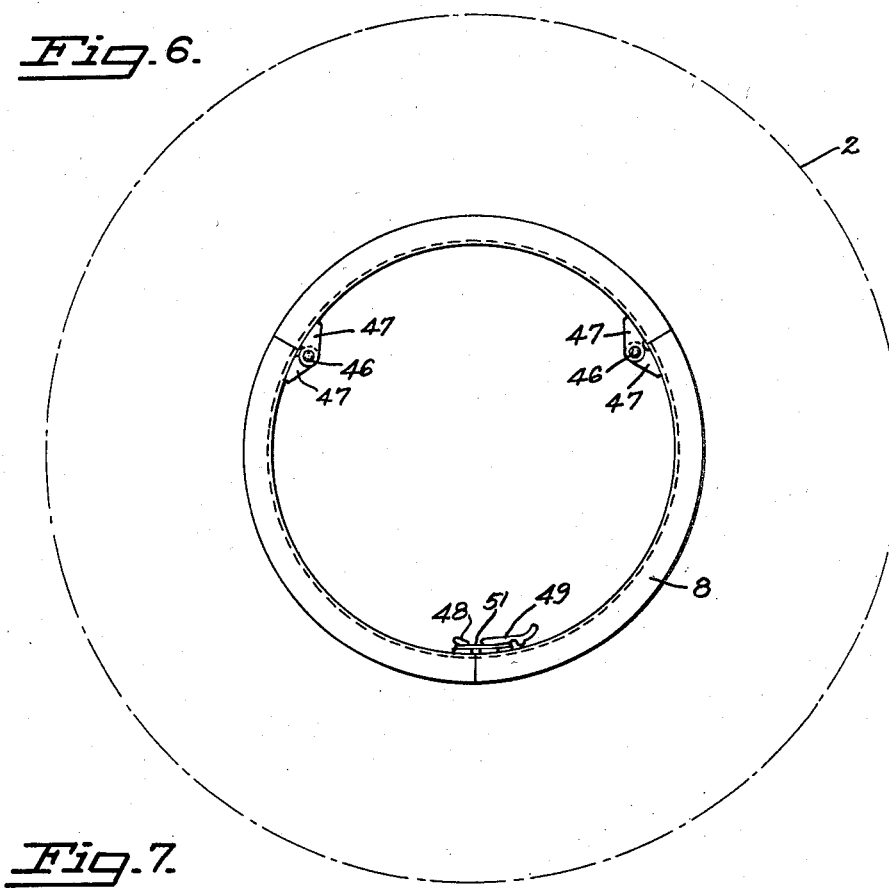
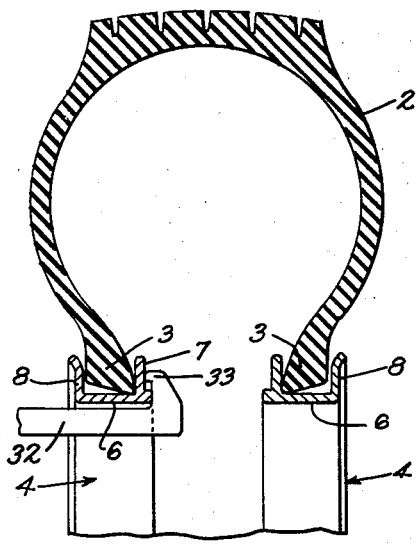
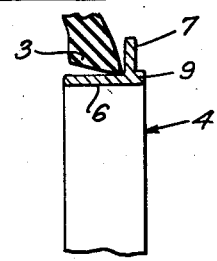
INVENTORS
ANTHONY T. FASSERO
JAMES R. MADDOX
BY George B. White
ATTORNEY

United States Patent Office 2,928,119
Patented Mar. 15, 1960

2,928,119

TIRE HANDLING APPARATUS FOR RETREADING MOLDS

Anthony T. Fassero and James R. Maddox, Oakland, Calif., assignors to The James C. Heintz Company, Cleveland, Ohio, a corporation of Ohio Application December 10, 1956, Serial No. 627,190

3 Claims. (Cl. 18—2)

This invention relates to tire handling apparatus for retreading molds.

In the handling of tires and matrices in previous machines and molds one of the disadvantages, particularly in connection with tubeless tires, has been that as the bead of the tire is spread in order to reduce the outer diameter of the tire for insertion into a circular matrix, the beads are distorted and do not spring back to their original circular shape, but become wavy to such an extent that they do not seal when the tire is again assembled on the rim. A further disadvantage of existing methods and devices is that the matrix is permanently held in the mold, and therefore the entire spreading device and the device for placing a tire in the matrix is held inactive throughout the period during which the tire casing is subjected to heat and pressure, and thereby the use of such equipment is wasted during each curing period. Attempts have been made to move the matrices with the tire casing thereon to the respective molds, but the supporting and carrying of the matrix was such that it resulted in misalignment and wobbling with attendant inaccuracy in the treads of the tire casing.

The primary object of our invention is to provide a device for spreading tire casings of various sizes in such a manner as to prevent the distortion or bending of the beads of the tire and also to allow the handling of the matrix so as to place it over the tire and provide means for the movement of the matrix which can be used in addition to the movement of the matrix over the tire casing also to carry the matrix and a casing in true vertical position from the spreader mechanism to a mold heater; thereby efficiently and quickly rendering the tire casing spreading or assembling device available for further use even during the curing operation of the tire casing.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 4 is a plan view of the spreading device without the tire casing or matrix being in place, showing the spreaders in broken lines in approximately relative operating position.

Fig. 5 is a front view of the machine showing the relative positions of the matrix and tire casing and the holder and spreader devices.

Fig. 6 is a plan view of one of the bead holder rings in position on a bead of the tire casing.

Fig. 7 is a sectional view of the bead holder rings on the tire casing, and

Fig. 8 is a sectional view of a modified form of the tire bead holding and spreading ring.

Figures 1, 2, 3:
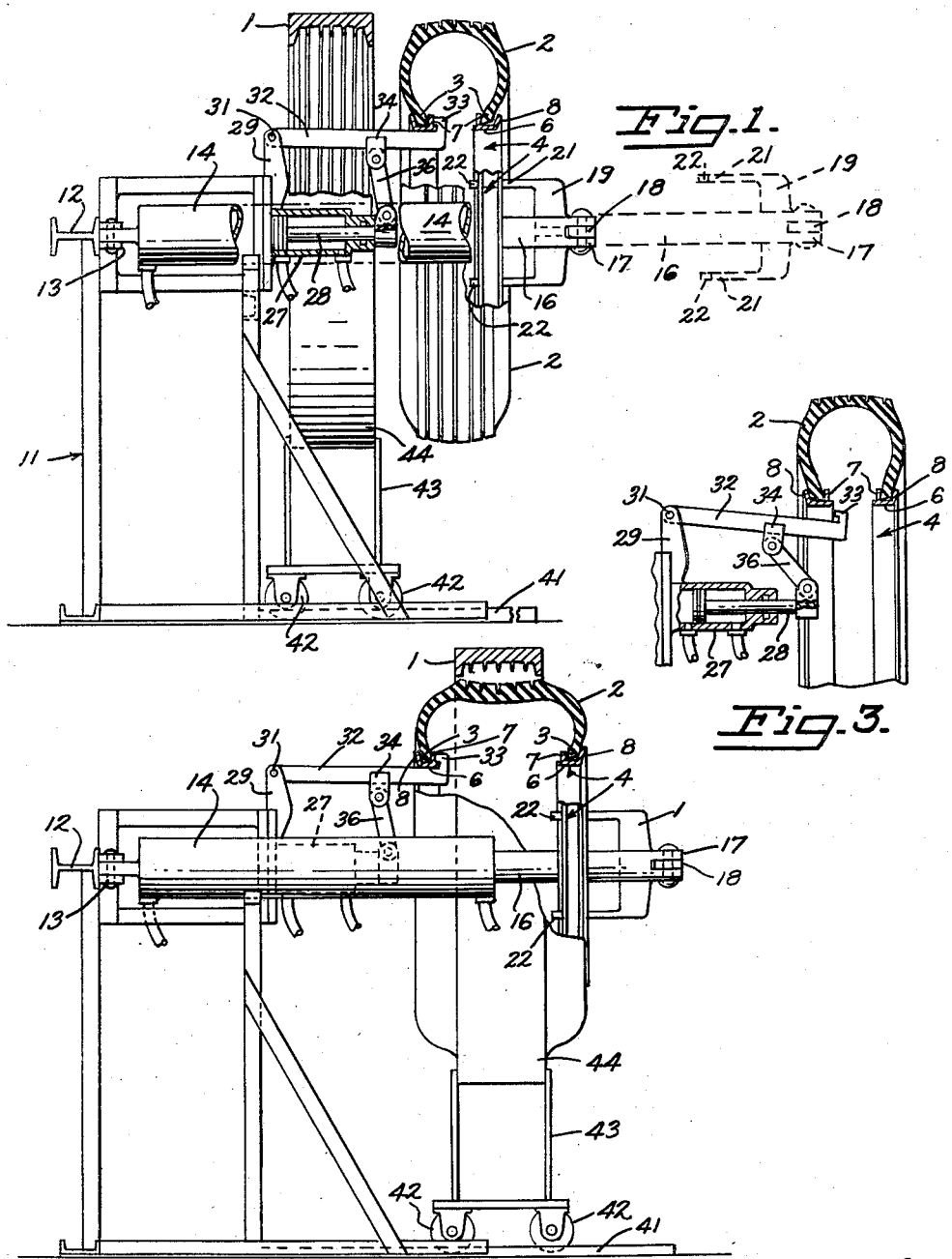
Fig. 1 is a side view of our device showing the tire holding device in position.
Fig. 2 is a side view of the device showing the tire spreading device in operation and the circumference of the tire reduced and the matrix in position over the tire casing.
Fig. 3 is a fragmental view of the tire casing and the bead holder arm in releasing position.

In the usual operation of a full circle band matrix 1 the tire casing 2 is first reduced in diameter by spreading the beads 3 thereof apart and either the spread tire casing is moved inside of the matrix 1 or the matrix 1 is moved over the tire casing 2 so that when the beads 3 are moved back toward one another the periphery or crown of the tire casing is expanded against the inner periphery of the band matrix 1 in proper alignment for curing the treads thereon.

In order to pull the beads 3 of the tire casing 2 apart, one of the beads is held stationary, usually, while pull is exerted on the other bead 3, so as to pull the latter apart from the first bead and thereby reduce the tire casing diameter. In my invention a bead holder ring 4 is provided for each bead 3 of the tire casing. This bead holder ring 4 is a rigid circular ring so that any pull or holding force exerted thereon is simultaneously transmitted to the entire circular bead instead of to only portions where the actual pulling arms apply force. For this purpose each ring 4 has a cylindrical base 6 with an inner flange 7 adapted to engage the inner side of the respective beads 3. As shown in Fig. 8, such a ring by itself would be sufficient for the spreading operation. When in addition to the spreading operation it is desired that the beads 3 be pressed together at times for expansion of the tire periphery, then another or outer flange 8 is provided which is capable of engaging the outer portion of the beads 3 so that in the form shown in Fig. 7 bead 3 is confined between the inner flange 7 and the outer flange 8 of the respective rings 4. In other words, in the form shown in Fig. 7, the bead protecting ring is of generally U-shaped cross-section while in the form shown in Fig. 8 it is of generally L-shaped cross-section. In each case a cylindrical projection or ledge 9 is provided on the ring to offer a shoulder to be engaged by the claws of the holder or spreader device to be hereinafter described.

The device is supported on a frame 11, on a top transverse member 12 of which are provided pairs of spaced bearing ears 13. In each pair of ears 13 at the respective opposite ends of the frame member 12 is pivoted a hydraulic or pneumatic cylinder 14 adapted in the usual manner to reciprocate a piston 16. On the outer end of each piston 16 is provided a forked bearing 17 in which is pivoted an arm 18 extended toward the middle of the machine or toward the other piston 16. On the inner end of each arm 18 is provided a fork or yoke 19 and on the free end of each fork arm is formed a claw 21 with a reversed hook 22 for engagement with the ledge 9 of the bead cover ring 4.

From the middle of the transverse top frame member 12 extends a bracket 26 on the end of which is fixed a cylinder 27 operated by suitable valves to reciprocate a piston 28. From the cylinder extend three brackets 29 generally radially and spaced about 120° apart. In each bracket 29 is pivoted on a pivot pin 31 a claw arm 32 which extends generally parallel with the cylinder 27 and piston 28 and terminates at its outer end in the reversed hook 33 for engagement with the inner ledge 9 of the adjacent bead ring 4. Each claw arm 32 has an ear 34 extended from the same toward the piston 28, and a link 36 is pivoted at one end thereof to the ear 34 and at its other end to the piston 28 so that as the piston moves outwardly from the cylinder 27, it pulls the link 36 and thereby pulls the arm 32 and the claw or hook 33 radially inwardly and away from the periphery of the ring 8. When the piston 28 is pulled inwardly of the cylinder 27, then it pushes the link 36 radially outwardly and also pushes the arm 32 and the claw 33 radially outwardly and into engagement with the ledge 9 of the adjacent ring 4.

A pair of rails 41 extend at right angles to the frame 11 and generally parallel with the central cylinder 27 and are equally spaced on the opposite sides of the cylinder 27. The wheels 42 of a carriage 43 ride on the rails 41. The carriage 43 is fixedly secured to the lower portion 44 of the band matrix 1. After the tire casing 2 is reduced in diameter by the spreading of the beads 3, then the band matrix 1 can be moved on its carriage 43 so that it is guided positively on the rail 41 in true vertical alignment with the tire casing 2 and after the expansion of the tire casing into the band matrix 1 the entire unit so assembled can be carried in a vertical position and placed directly into a suitable heating device for the purpose of curing the tread on the casing.

It is to be noted that the bead protecting ring 4 may be made in any suitable manner to facilitate insertion without injuring the beads. In the present illustration each bead ring 4 is made of three sections. The sections are connected by pivots 46 in overlapping ears 47 at the meeting ends of two adjacent sections. A pair of hooks 48 at the third joint can be clamped together by a suitable latch in the usual manner. In this manner, each ring 4 can be collapsed and then expanded over the respective beads 3 and held there securely for the protection of the beads.

In operation bead rings 4 are first placed over the respective beads of the tire casing 2. Then the tire casing so provided with its protective bead rings 4 is held in position while the central piston 28 is operated so as to move the hooks 33 of the free arms 32 into engagement with the adjacent ledge 9 of the adjacent ring 4. Then the pistons 16 are operated so as to bring the yokes 19 toward the outer bead ring 4. The yoke arms 18 are swung around their pivots in the forked end 17 so as to tip the hooked ends 21 and permit entry of the same in the inside of the adjacent or outer bead ring 4 so that the reversed hooks 22 can engage the ledge 9 of said outer ring 4. Then the pistons 16 are operated again so as to move outwardly from the position shown in Fig. 1 into the position shown in Fig. 2. As the hooks 33 of the arms 32 hold the inner ring 4 and the bead 3 therein stationary, the other bead 3 is pulled outwardly, thereby reducing the circumference of the tire casing as shown in Fig. 2. Then the band matrix 1 is moved on its carriage over the reduced crown of the tire casing 2 as shown in Fig. 2. Then the pistons 16 are drawn inwardly and the tire casing is thus expanded and by reason of the wheeled carriage 43 it accurately engages the inner periphery of the band matrix 1. The rails 41 assure concentric alignment of the tire casing 2 with the band matrix 1. After the pistons 16 are operated so as to move inwardly and allow the tire casing to expand into the matrix 1, then the arms 18 are swung inwardly to release the hook 22 and allow withdrawal of the outer claws. Then the central piston is operated to pull the hooks 33 inwardly and thus free the tire casing. Then the tire casing in the band matrix 1 can be wheeled away on the carriage 43 to a heating device where it is properly heated until the tread is cured.

For the insertion and removal of each bead ring 4 the latch 49 is pulled up so that its link 51 disengages the hook 48 and that allows the collapsing of the sections of the bead ring 4 around the pivots 46 and its removal from the bead 3 of the tire casing 2.

The device is very simple in structure and operation but it overcomes many difficulties heretofore experienced in this art. It definitely prevents the waving of the beads of the tire casing during said contraction operation, it permits a simple operation for the uniform spreading of the beads of tires and true alignment of the band matrix with the reduced crown for the insertion of the tire casing in the matrix. The device is simple in structure and operation, does not require any particular adjustment or setting up and it is eminently adapted for use by ordinary labor available, yet for accurate tread applying in curing results.

We claim:

1. Tire-retreading apparatus comprising a circular mold which is mounted on rollers to facilitate movement thereof from place to place during the retreading operation, said mold being in a substantially vertical position during such movement, stationary means separate from the mold adapted to cooperate with the mold and including movable means for positioning a tire in the mold when the tire is centered with respect to the mold, and guiding means separate from the mold and coacting with the stationary means in an established relation for centering the mold coaxially with respect to the tire-positioning means and maintaining said centered relationship during positioning of the tire in the mold.

2. The tire-retreading apparatus of claim 1 in which the guiding means includes a track on which the rollers are mounted and adapted to roll.

3. The tire-retreading apparatus of claim 1 in which the movable means for positioning the tire is spreader means adapted to engage the opposite beads of a tire whereby on separation of the beads the circumference of the tire is reduced and on movement of the beads toward one another the circumference of the tire is increased and thereby positioned in the mold.

References Cited in the file of this patent

UNITED STATES PATENTS

| | | |
|---|---|---|
| 1,288,733 | Stevens | Dec. 24, 1918 |
| 2,280,401 | Fryckstrom et al. | Apr. 21, 1942 |
| 2,302,133 | Maze | Nov. 17, 1942 |
| 2,335,878 | Oren | Dec. 7, 1943 |
| 2,407,806 | Arnold et al. | Sept. 17, 1946 |
| 2,444,898 | Butterfield | July 6, 1948 |
| 2,451,097 | Kraft | Oct. 12, 1948 |
| 2,475,579 | Napier | July 5, 1949 |
| 2,477,858 | Brabbin | Aug. 2, 1949 |
| 2,591,934 | Hawkinson | Apr. 8, 1952 |
| 2,644,984 | Crooker | July 14, 1953 |
| 2,665,108 | Branick | Jan. 5, 1954 |
| 2,712,156 | Potter et al. | July 5, 1955 |
| 2,856,460 | Heintz | July 31, 1956 |
| 2,850,263 | Hawkinson | Sept. 2, 1958 |
| 2,872,704 | Schaevitz | Feb. 10, 1959 |

OTHER REFERENCES

"Hawkinson Treads," pamphlet printed 1940.